Aug. 17, 1954     R. H. GRIFFIN     2,686,415
CONTROL MECHANISM Filed April 3, 1951     5 Sheets-Sheet 1

INVENTOR
*Robert H. Griffin*
BY *Wilmer Mechlin*
HIS ATTORNEY

Aug. 17, 1954   R. H. GRIFFIN   2,686,415
CONTROL MECHANISM
Filed April 3, 1951   5 Sheets-Sheet 3

INVENTOR
Robert H. Griffin
BY Wilmer Mechlin
HIS ATTORNEY

Fig. 5.

INVENTOR
Robert H. Griffin
BY Wilmer Mechlin
HIS ATTORNEY

Aug. 17, 1954  R. H. GRIFFIN  2,686,415
CONTROL MECHANISM

Filed April 3, 1951  5 Sheets-Sheet 5

INVENTOR
*Robert H. Griffin*
BY *Wilmer Mechlin*
HIS ATTORNEY

Patented Aug. 17, 1954

2,686,415

UNITED STATES PATENT OFFICE 2,686,415

CONTROL MECHANISM

Robert H. Griffin, Yonkers, N. Y.

Application April 3, 1951, Serial No. 219,065

20 Claims. (Cl. 69—41)

This invention relates to controls for automatic apparatus of the type in which work is conveyed to and treated in one or more treating zones.

The primary object of the invention is to provide an improved control mechanism for causing treating means associated with a work support to treat work in definite space relation to the relative travel of the treating means and the work.

Another object of the invention is to provide an improved electro-magnetic control mechanism wherein a plurality of magnetically shiftable elements are employed to record a signal corresponding to the travel of a work piece on a conveyor past a reference point and that signal is utilized to actuate associated treating devices in definite relation to the travel of the work piece through the treating zones in which the devices are stationed.

An additional object of the invention is to provide an improved electro-magnetic control for automatically controlling the operation of treating means associated with a movable work support, which, through selectively shiftable elements, is capable of recording and wiping out the determining characteristics of each work piece coincident with its travel past the treating means and of employing that record to actuate the treating means, enabling a plurality of work pieces of different characteristics to be treated in rapid succession at cycles varying in accordance with the characteristics of each piece.

A further object of the invention is to provide an electro-magnetic control mechanism employing a record made by selectively shiftable elements for controlling the operation of treating means past which work pieces are conveyed, wherein the limits of the operative cycle of the treating means for a given work piece can be adjusted at will and, once adjusted, will automatically compensate for variations in the individual work pieces.

Another object of the invention is to provide an electro-magnetic control mechanism for automatically controlling the operation of treating means associated with a movable work support, whereby a record of the determining characteristics of each work piece, made by the selective magnetic shifting of a plurality of shiftable elements coincident with the travel of each work piece past a reference point, is employed to actuate the treating means and the shifted elements are temporarily locked in shifted position to insure such actuation.

A further object of the invention is to provide a control mechanism, employing a plurality of elements selectively shiftable into locked positions for controlling the operation of treating means associated with a movable work support, wherein means are provided for preventing jamming of the element in process of shifting.

Other objects and advtantages of the invention will appear hereinafter in the detailed description, be particularly pointed out in the appended claims, and illustrated in the accompanying drawings, in which:

Referring now in detail to the drawings in which like reference characters designate like parts, the improved control mechanism of the present invention is adapted to control the treatment of work by apparatus in which work is moved relative to treating means in one or more treating zones, usually by one or a system of conveyors or other movable work supports. An exemplary form of such apparatus is the skin treating apparatus of my co-pending application Serial No. 159,436, filed May 2, 1950, to which the control mechanism has been applied for purposes of illustration. Since that apparatus is designed especially for performing "beam house"

operations on skins, hides, and the like, hereinafter generally termed skins, the structure and operation of the control mechanism will be described primarily with reference to such treatment, as representative of both the simple and the more complex work treatments which the mechanism is adapted to control.

Figure 1:
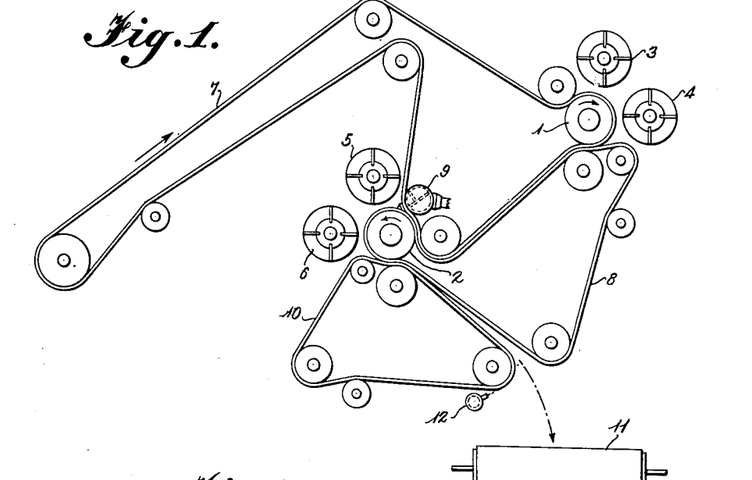
Figure 1 is a schematic side elevational view of the conveyors and associated devices of a treating apparatus representative of the automatic apparatus which the improved control mechanism of the present invention is adapted to control.

The illustrated apparatus is comprised of a pair of work supporting drums 1 and 2 positioned in spaced treating zones and provided with treating devices, which for "beam house" operations will normally be in the form of pairs of counter-rotating cutters or bladed cylinders. Each of these cutters rotates constantly during operation of the apparatus and is reciprocable by fluid pressure substantially, radially of the associated drum, to operative and inoperative positions, the cutters being numbered, respectively, 3 and 4 for the first or upper drum 1 and 5 and 6 for the second or lower drum 2. Adapted to have both sides treated in their entireties in a single pass, a skin is introduced into the apparatus on a feed conveyor 7 by which it is carried, preferably flesh side down, to and around the first or unhairing drum, past the unhairing cutters 3 and 4. On leaving the first drum, the skin is carried between the feed conveyor 7 and an intermediate conveyor 8 to the second or fleshing drum 2, where it is transferred from the feed conveyor 7 to the intermediate conveyor 8 by a transfer device 9, such as the fluid pressure transfer device illustrated in detail in my co-pending application Serial No. 190,621, filed November 16, 1950. The skin is then carried over the fleshing drum 2 past the fleshing cutters 7 and 8 and thereafter deposited on an end conveyor 10 by which it is carried to a discharge conveyor 11, the latter serving to discharge it from the apparatus. Some difficulty having been experienced in ensuring transfer of skins between the end and discharge conveyors 10 and 11, as well as between the feed and intermediate conveyors, there is employed in the preferred form of the apparatus a second fluid pressure device 12 for directing jets on the end conveyor 10 counter its direction of travel at the point of transfer of the skins, this device being either used alone or supplemented by a mechanical scraper (not shown).

The control mechanism of the present invention is designed to cause each of the treating and transfer devices, to operate or act on a skin in definite relation to its travel through the apparatus. Designated generally as 13, the control mechanism comprises, in essence, a member drivably connected to and movable in synchronism, concert or coordination with a conveyor or other movable support by which work is carried to a treating zone, a plurality of shiftable elements for recording a transitory signal corresponding to the particular work undergoing treatment, means actuated by the signal for controlling the operative cycle of the associated treating means, and means for holding, retaining or locking both the shifted and unshifted elements in position during such actuation.

Figure 3:
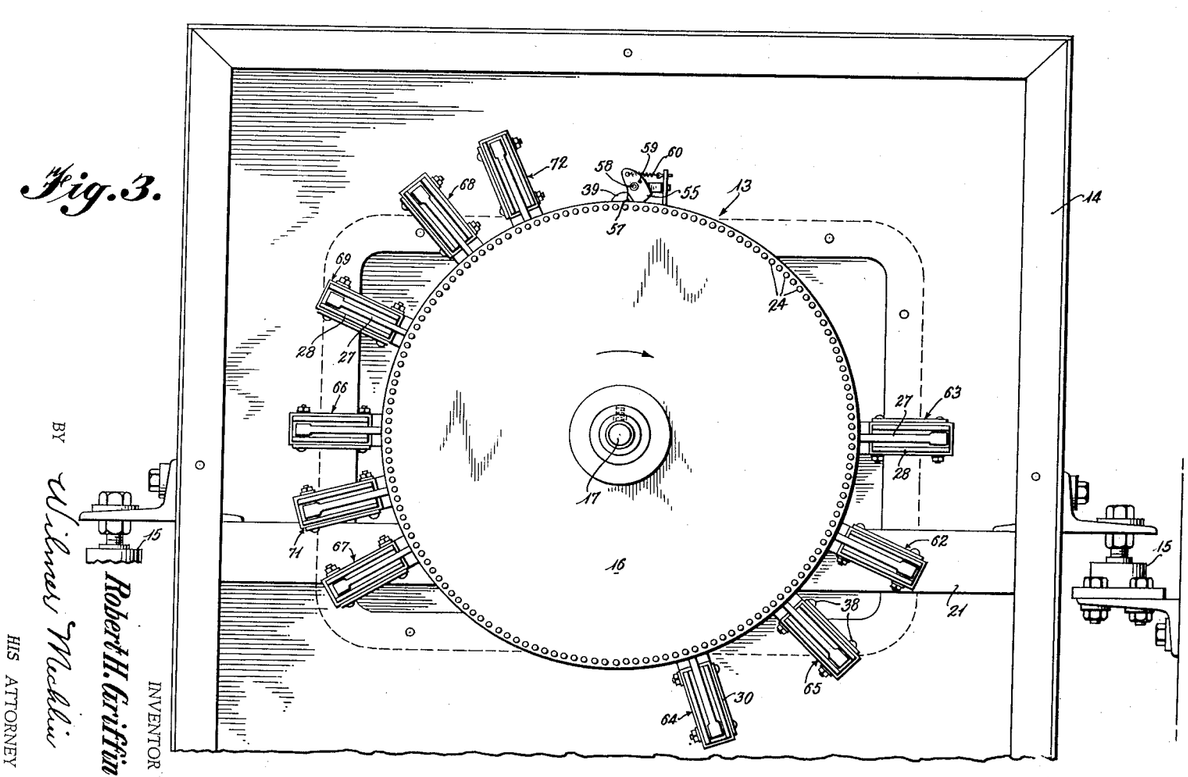
Figure 3 is an end elevational view of a preferred embodiment of the control mechanism.
Figures 4, 6, 7:
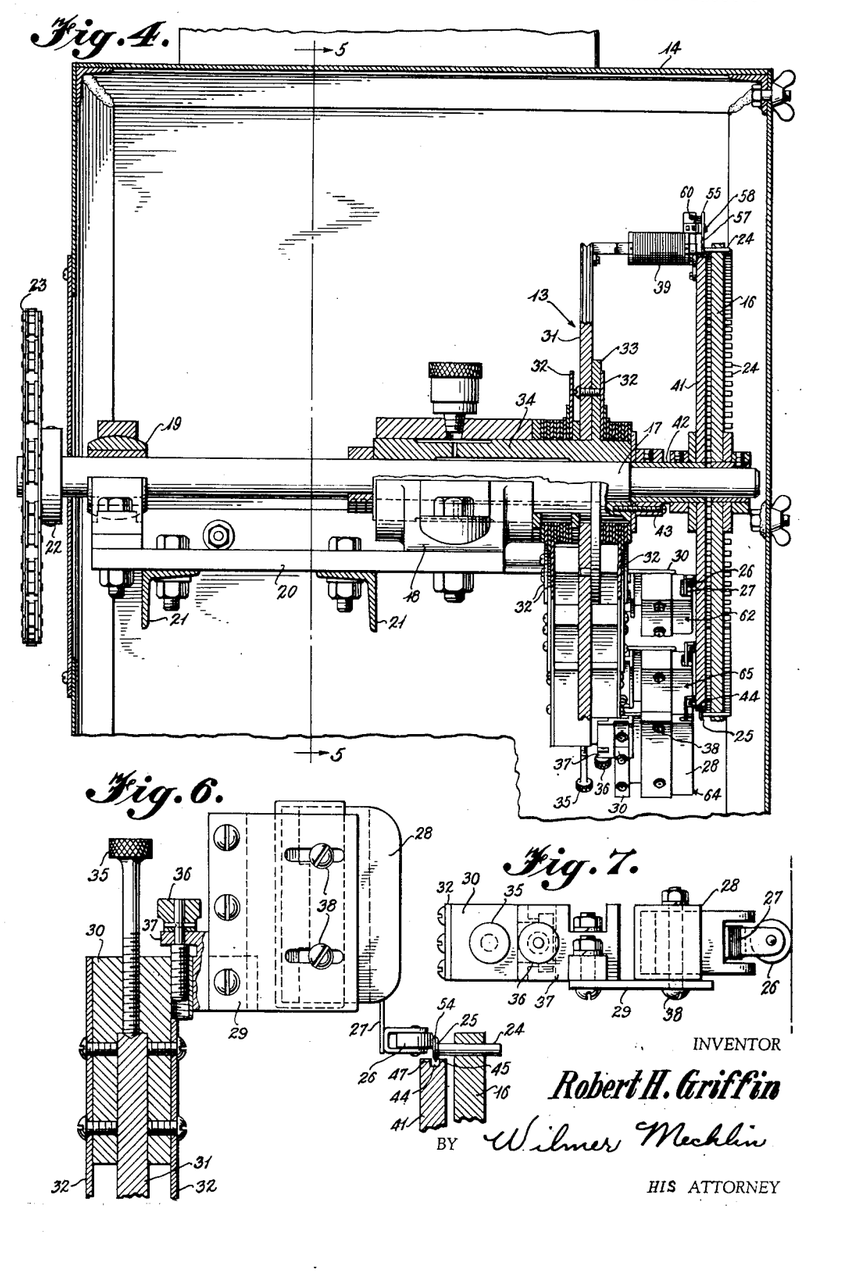
Figure 4 is a side elevational view of the control mechanism with portions broken away and shown in section to more clearly indicate certain of the details of construction.
Figure 6 is a fragmentary side elevational view on an enlarged scale of one of the control heads and associated structure with portions broken away and shown in section to more clearly illustrate its details of construction.
Figure 7 is a plan view of the head of Figure 6.

In its illustrated form in which it has been adapted to control the operation of the several treating and transfer devices of the apparatus of my co-pending application Serial No. 159,436, aforementioned, the control mechanism 13 is housed in a control box 14 mounted on a side (not shown) of the apparatus and connected thereto through shock-proof mountings 15 to minimize breakage. The mechanism has as its conveyor-synchronized movable member or component a recorder or control disk 16 keyed or pinned to a rotary drive shaft 17, journalled within the box in a split journal 18 and a spaced pillow block 19 which are mounted on a base plate 20 supported by X-bars 21. This shaft projects outside the box and there is drivably connected to the drive (not shown) of the several conveyors by a sprocket wheel 22 and a reduction chain drive 23. Intended to encompass in one revolution the passage of a skin from a reference point through the stations or the several treating and transfer devices, the recorder disk is driven at a reduced rate relative to the linear travel of the conveyors, the reduction ratio in the illustrated embodiment being about 3.3:1.

Figure 5:
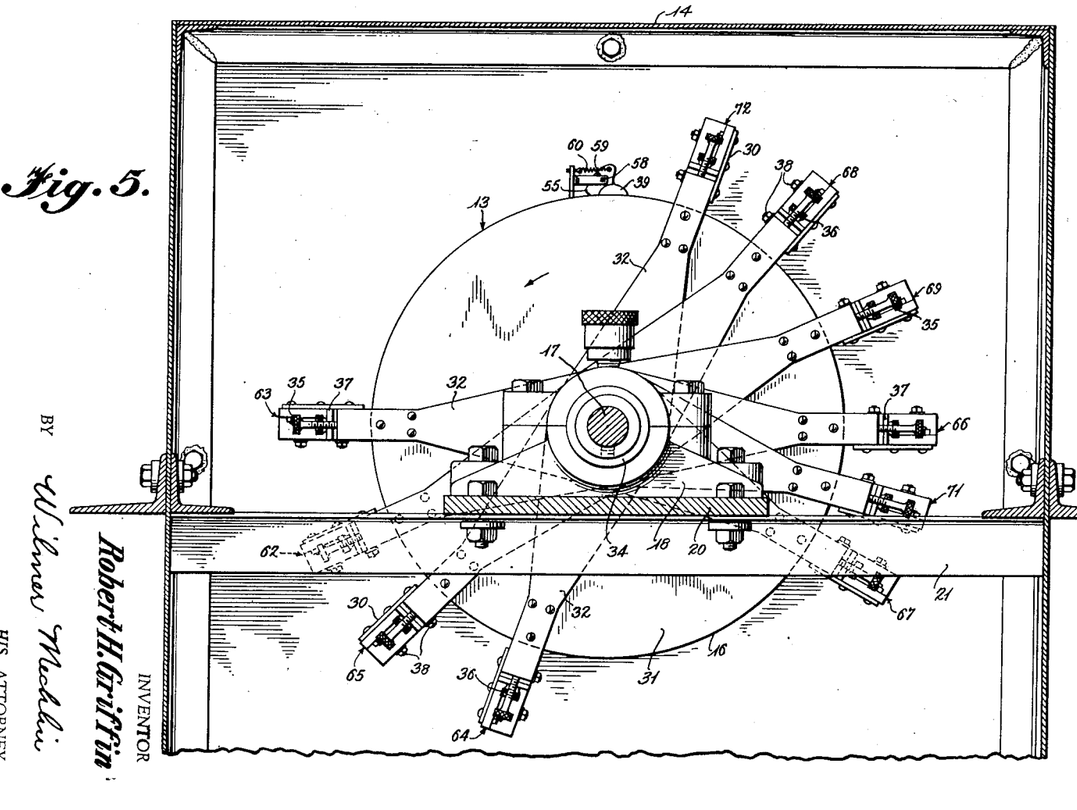
Figure 5 is a transverse vertical sectional view taken along the lines of 5—5 of Figure 4.

Slidably seated in the recorder disk 16 in radial arrangement and circumferentially spaced relation adjacent its periphery are a plurality of elements or pins 24, each shiftable or displaceable axially of the disk and having an enlarged head 25 at one end. Ranged or disposed about the same disk and having rollers 26 at the ends of their actuating arms 27 confronting and adapted to ride on the outer faces of the heads 25 of the pins 24 are a plurality of control devices 28, preferably in the form of micro-switches. Each of these switches is carried by a switch holder or mounting bracket 29 slidably mounted radially of the recorder disk 16 on a substantial U-shaped bifurcated or slotted slide piece or block 30 embracing the opposite sides and overlying the periphery of a stationary positioning plate or disk 31 and being connected to spaced guide arms 32 on either side of the plate. The stationary plate 31 is fixed to an annular flange 33 of a sleeve bearing 34 about which the guide arms 32 are adapted to rotate, the sleeve bearing, in turn, encircling and permitting free relative rotation of the drive shaft 17. To prevent induced rotation of the sleeve bearing 34, it is gripped beyond the giude arms 32 by the split journal 18.

To permit their relative adjustment circumferentially of the positioning plate 31 and, therethrough, of the recorder disk 16, the pairs of guide arms of the several control switches 28 are interleaved and spaced at progressively greater distances from the positioning plate, the inner arms thus serving as spacers for the outer arms. For setting the control switches in predetermined positions circumferentially of the positioning plate, the periphery of the latter is grooved and adapted to receive adjusting screws 35, each threadedly engaging the slide piece 29 of one of the switches and extending radially of the plate, tightening of these screws fixing the associated switches in any desired circumferential positions. Radial adjustment of each of the control switches 28 to insure that its pin contacting roller 26 will have the proper riding contact with the heads 25 of the pins 24 is provided by a second adjusting screw 36 which is rotatably connected to or collared by an off-set or lug 37 formed in the associated switch holder 30 and threadedly engages the related slide piece 29, these screws being disposed radially of both disk and plate. Provision is also made for adjustment of the control switches 28 axially of the positioning plate 31 through screw and slot connections 38 between each of the switches and its mounting bracket 29.

With the control disk 16 rotating at a given or predetermined ratio relative to the linear travel of a skin by its driving connection with the conveyors and a complete rotation or revolution of the disk encompassing or including the entire passage of a skin through the apparatus, it is only necessary progressively to displace the pins 24, starting as the leading edge of a skin passes a reference point and continuing until the trailing edge of the skin passes the same reference point, to record a signal corresponding to and imaging or duplicating on a scale determined by the speed ratio, the length and position of the particular skin undergoing treatment and varying in accuracy directly with the number of the pins. Even for controlling the treatment of a sequence of skins, where the variations in linear dimensions of individual work pieces are relatively wide, the one hundred forty four pins carried by the illustrated embodiment of the control disk have been found to afford sufficient accuracy. This number, of course, may be increased or decreased as necessary to suit the type of work and the treatment to which it is subjected.

Figure 2:
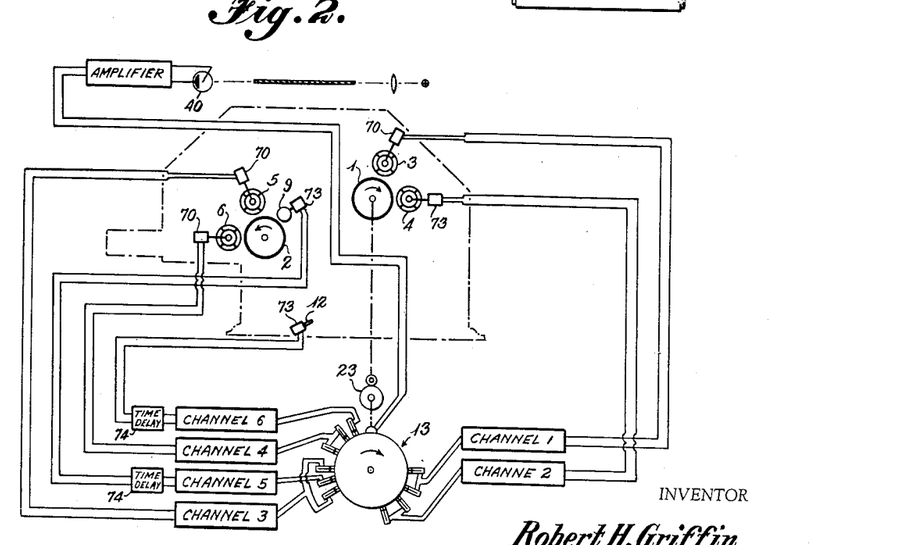
Figure 2 is a diagrammatic view showing the relation between the treating apparatus of Figure 1 and the control mechanism.

The desired progressive displacement of the pins 24 is obtained by selectively attracting them by an electro-magnet 39, energized at the instant the leading edge of a skin passes a reference point by a suitably sensitive triggering or initiating device, such as a photoelectric cell 40. This cell is mounted on the apparatus in advance of the several treating and transfer devices, with its light beam directed across the feed conveyor 7 and adapted to be broken or interrupted so long as any portion of a skin is passing through it. So fixing the reference point and electrically connected to the electro-magnet 39 through a suitable amplifier circuit, the photoelectric cell 40 will energize and deenergize the magnet in exact correspondence with the passage past that point of the leading and trailing edges of the skin. The magnet is preferably axially aligned with the pins 24 and confronts and is spaced or separated from their heads 25. The illustrated magnet is mounted between the positioning disk 31 and a second stationary guide or locking disk or plate 41 which is interposed between the positioning disk and the recorder disks 16 and directly confronts the latter. This guide disk is separated from the drive shaft 17 by a sleeve bearing 42 on which it is swedged, the bearing in turn being locked against rotation by a collar 43 by which it is keyed to the main sleeve bearing 34 journaling the drive shaft.

Figures 8, 9, 10:
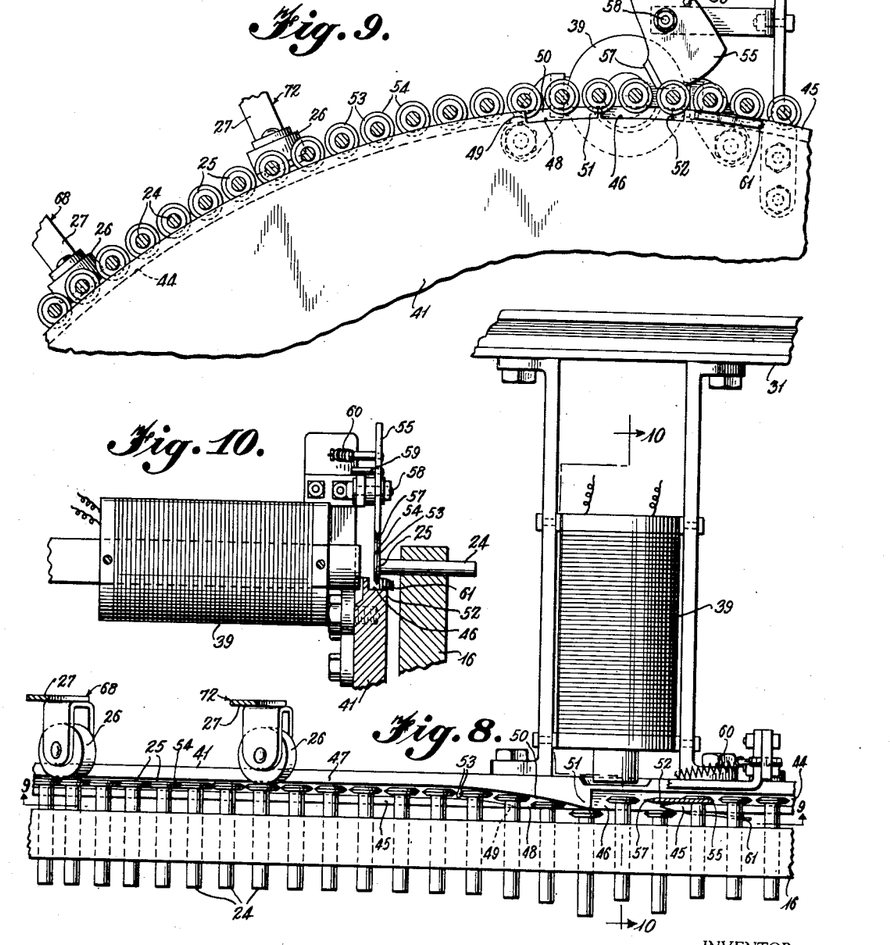
Figure 8 is a fragmentary plan view on an enlarged scale of the record making and erasing components of the control mechanism.
Figure 9 is a vertical sectional view taken along the lines 9—9 of Figure 8.
Figure 10 is a vertical sectional view taken along the lines of 10—10 of Figure 8.

While the stationary intermediate or guide disk here serves as a support to fix the position of the magnet 39 relative to the path of the pins 24, its main purposes are to lock in shifted position any of the several pins which are shifted or displaced by the magnet during the interval in which it is energized and to restore the shifted pins to normal or initial position at the end of each operating cycle in order to wipe out the signal and enable the control disk to record a signal corresponding to the succeeding skin or other work piece. To this end the guide or locking disk 41 has a peripheral channel or groove 44 normally defined by and separated or blocked from the pins 24 by an annular locking lip or flange 45 which has its marginal edge or periphery contained radially within the bodies of the pins 24 and partly overlies or overlaps their heads 25. The lip 45 is interrupted adjacent the position of the magnet 39 by an entrance slot or aperature 46 of slightly greater width than the heads of the pins and providing a passage through which they can enter the annular channel 44. The channel is bounded, away from the recorder disk 16, by a rear wall 47 and is of sufficient width and depth to accommodate the portions of the heads 25 projecting beyond the bodies of the pins. It extends around the guide disk 41 from the entrance inlet opening or slot 46 to a point in advance of that slot, there terminating in an exit or outlet opening or slot 48. The outlet slot is defined on one side by the trailing end 49 of the lip 45 and on the other by a cam or wedge 50, the cam slanting or sloping across the normal course of the channel 44 toward and in the direction of travel of the recorder disk 16 and forming part of a shoulder or abutment 51, integral with the rear wall 47 and separating the inlet and outlet slots. With the guide and recorder disks, 41 and 16, spaced axially of the drive shaft 17 sufficiently to accommodate the heads 25 of the pins therebetween and the lip 45 contained radially within the bodies of the pins, the heads may ride either within the channel 44 or between the disks without interfering with rotation of the recorder disk.

For efficient recording of the characteristics of a skin, the pins 24 are made of carbon steel or like magnetically attractable material and the magnet 39 is positioned relative to the locking disk 41 so that the end of its magnetizable core 52 is disposed, circumferentially of the disk, substantially midway of the entrance slot 46. By separating the core 52 from the channel 44 by a portion of the rear wall 47 of the channel and making both the guide and recorder disks of stainless steel or other non-magnetic material, the magnet, when energized, is limited in action to the pins and will progressively attract them as their heads 25 reach the entrance slot and pull or draw their heads into the guide channel 44 toward its rear wall. The shifted pins thereafter are locked in shifted position by engagement of their heads with the lip 45 until the heads reach the outlet slot 47, when they are cammed or shifted back to normal position by engagement with the cam 50.

The entrance slot 46 must be sufficiently wide to permit a pin to be displaced or shifted sufficiently for its head to enter the guide channel in the interval in which it moves across the slot, this depending upon the speed of the recording disk and the pull of the magnet. At the same time the slot must be too narrow to permit the passage of more than one pin head at a time, if the control is to be sufficiently selective. These restrictions on the width of the slot make it possible for a pin to jam against the leading end 52 of the lip 45 if the magnet is energized or deenergized while the pin is moving across the slot. The problem is considerably reduced by bevelling the sides of each of the pin heads 25 inwardly of one or both faces so that they taper radially to a knife edge 54 correspondingly forming the leading end of the lip, thus causing the pin to be cammed or deflected to one or the other side of the lip except when their knife edges are in exact alignment.

To prevent jamming of pins under any circumstances there is provided a yieldable member which is engageable with the pin heads 25 in advance of the leading end 52 of the lip to deflect them to one side and, itself, will yield and pass the pins, should its edge and that of any of the pins be in alignment. In the illustrated embodiment the yieldable member is a blade 55 mounted to swing or pivot axially of the pins 24 on a hanger or bracket 56 attached to the back of the locking disk 41 and having a knife edge 57 below its pivot point 58. The blade overlies the entrance slot 46, with its knife edge 57 projecting into the slot slightly in advance of the pointed leading end 52 of the lip and yieldably or resiliently held in that position by a stop 59 and spring 60 between the blade and the bracket 56. By disposing the blade 55 such that its edge 57 is on one side or the other, normal to the axis of the locking disk, of the plane, of the pointed end 52 of the lip and, if the blade is thin, at a spacing, axially of the disk, less than the depth of the taper or bevel of the sides 53 of the pin heads, the edge 57, on contacting a pin head, will direct that head clear of the leading end 52 of the lip. Adapted at the same time to yield in the direction of rotation of the control disk 16, the blade 55, should its knife edge 57 align with the edge 54 of a pin head, will yield or move out of the way. Since the knife edge of the blade is displaced axially from the point of the lip, the edge of the head must then be out of alignment with that point, causing it to pass to one side or the other, depending on the side on which the edge 56 of the knife blade is disposed, the edge in the illustrated embodiment being displaced inwardly of the point toward the channel to minimize contact with the pins.

Although the cam 50 is adequate to shift any displaced pins from the channel 44 and the axial momentum so imparted to the pins will normally clear their heads 25 of the locking disk 41, such clearance is further insured by a spring finger 61 mounted on the locking disk and positioned to engage the outer faces of the heads beyond the entrance slot and force the heads to seat against the confronting face of the control disk.

With the pins 24 selectively shiftable in coincidence with the travel of a work piece past the photoelectric cell 40 and lockable in shifted position by the locking disk 41 for substantially a full revolution of the recorder disk 16, their heads 25 are made to provide a control surface or track for the rollers 26 of the actuating arms 27 of the micro switches 28, which track corresponds in limits exactly with those of the work piece undergoing treatment. The switch actuating arms, being resilient, hold the rollers against the pins in both normal and displaced positions of the latter. By using control switches of sufficient sensitivity, such as the illustrated micro switches, and so adjusting their positions axially of the locking disk through their screw and slot connections 38 with their mounting brackets 30, the switches will be closed only when their rollers ride on pins locked in the guide channel 44, axial displacement of the pins through the control actuation of switches, is enabled to control the operative cycles of the several treating and transfer devices.

Figure 2 shows the relation between the several treating and transfer devices of the treating apparatus and the components of the electromagnet control mechanism. It will be noted from that figure that for each of the cutters there are provided two control switches and that the switches of each pair are connected in series in the circuit of the associated cutter, these circuits being designated as channels 1, 2, 3 and 4 for the cutters 3, 4, 5 and 6, respectively. The provision of a pair of switches for each cutter and their series connection enable the action of each of the cutters to be limited to a portion of the presented surface of a skin, substantially one-half of the surface of the average skin of the batch for which the control is set. Of each pair, one switch is an on or in switch and the other an off or out switch, the in and out switches of the cutters being numbered, respectively, 62 and 63 for cutter 3, 64 and 65 for cutter 4, 66 and 67 for cutter 5 and 68 and 69 for cutter 6. The in switches, as their name implies, are adapted to operate the solenoid-actuated valves 70 of the associated cutters to cause the latter to move into treating position against a skin, while the out switches have the reverse function. The two transfer devices 9 and 12, need but one control switch apiece, the switches numbered 71 and 72, respectively, by closing the circuits of the associated solenoid-actuated valves 73, causing the transfer devices to begin to act as the leading edge of a skin reaches their treating stations. The action of the treating devices is then continued for a preselected period, determined by the adjustment of an "Agistat" or other suitable adjustable time delay device 74 wired in each circuit. This relatively simple control is made possible since the only concern of the transfer devices is the detachment of a skin from the preceding conveyor and, once a considerable part of the leading portion of a skin has been detached, the remainder will automatically follow without further positive severence. On Figure 2 the electrical circuits of the transfer devices 9 and 12 are designated as channels 5 and 6, respectively.

In a full cycle of operation of the treating apparatus, a skin, introduced into the apparatus on the feed conveyor 7, trips the photoelectric cell 40, as the leading edge of the skin reaches and intercepts the light beam of the cell. At that instant the electromagnet 39 becomes energized and begins to shift the pins 24 into the guide channel 44 as their heads 45 reach the entrance slot 46, this continuing until the trailing edge of the skin passes the cell, thereby restoring the light beam and deenergizing the magnet. In the interim the displaced pins are carried around the channel, the leading pin first reaching and closing the out switch 63 of the first cutter 3 and the succeeding displaced pins holding this switch closed until the last one has passed its station. Since connected in series with the paired on or in switch 62, the closing of the out switch 63 has no effect on the first cutter until the in switch is also closed by the leading of the displaced pins, the cutter then moving in and beginning to act upon the skin and continuing so to act until the out switch is opened, breaking the circuit and causing the first cutter to move to inactive position. In succession the displaced pins act in the same manner upon the remaining cutters and the the transfer devices, starting them by the first of the displaced pins and in the case of the cutters continuing their action until the last displaced pin has passed the roller 26 of the actuating arm 27 of its out switch. Each of the displaced pins having served its purpose after it has passed under the roller of the last of the control switches, is enabled to be restored to normal position by the cam 50 without affecting the operative cycles of the several devices and is ready to record the limits of a succeeding skin as it reaches the entrance slot 46, even though a portion of the record of the preceding skin may still remain on the record disk 16. By progressively recording and erasing each signal and always presenting the pins in unshifted position to the actuating magnet, the control mechanism is enabled to handle work pieces presented for treatment in rapid sequence and at minimum spacing.

It has been mentioned that the several control switches may be adjusted in position circumferentially of the positioning disk 31. While having use in adapting a single control mechanism to various types of automatic machines by the provision of sufficient control switches to accommodate the number of work stations and by driving the recording disk at an appropriate speed ratio, such adjustability is of particular advantage on a single machine in which the relative positions of the treating devices or the limits of their action are subject to change. Thus, in the illustrated skin treating apparatus, the in or out switch of each cutter, depending on whether the cutter acts on the leading or trailing portion of a skin is substantially fixed in position, peripherally of the positioning disk, relative to the position of the magnet 39, by the linear distance of the associated cutter from the photoelectric cell 40. However, the companion switch of each cutter is not so fixed and can be adjusted in position relative to the paired switch, as desired, to vary the operating cycle of the associated cutter on any given skin. This is of particular advantage when skins are to be treated in batches, each of relatively uniform skins, and there is a wide variance between succeeding batches, proper adjustment enabling overlap of action of the cutters in each treating zone to be held to a minimum. If, on the other hand, the skins are not first batched according to characteristics, the control can be set to handle skins of the maximum and minimum possible lengths and thereafter will automatically vary the operative cycles of the several cutters in direct proportion to the length of each individual skin.

From the above detailed description it will be apparent that there has been provided an improved electromagnetic control mechanism for automatic apparatus which is able to control the treatment by the associated treating means of a series of work pieces introduced in close sequence into the apparatus and will automatically vary the cycle of treatment to suit the characteristics of each individual work piece. It should be understood that the illustrated embodiment is merely exemplary of the invention and that all modifications are intended to be included which do not depart either from the spirit of the invention or the scope of the appended claims.

Having described my invention, I claim:

1. The combination with apparatus having relatively movable work supporting and treating members, of control mechanism comprising a member movable in fixed ratio to said relative movement of said supporting and treating members, a plurality of elements carried by said movable member and shiftable relative thereto, stationary means responsive to movement of work on said supporting member and confronting and spaced from said shiftable elements for selectively shifting said elements to record characteristics of said work, means actuated by said shifted elements for causing said treating member to treat said work, and means for restoring said shifted elements to normal position on said movable member in advance of presentation thereof to said shifting means.

2. The combination with apparatus having relatively movable work supporting and treating members, of control mechanism comprising a member movable in fixed ratio to said relative movement of said supporting and treating members, a plurality of elements carried by said movable member and shiftable relative thereto, means responsive to movement of work on said supporting member for selectively shifting said elements to record characteristics of work undergoing treatment, means actuated by said shifted elements for causing said treating member to treat said work, and means for positively locking said shifted elements in shifted position during actuation thereby of said actuating means.

3. The combination with apparatus having relatively movable work supporting and treating members, of control mechanism comprising a member movable in fixed ratio to said relative movement of said supporting and treating members, a plurality of elements carried by said movable member and shiftable relative thereto, stationary means confronting and permanently spaced from said shiftable elements for selectively shifting said elements to record characteristics of work on said work support, means actuated by said shifted elements for causing said treating member to treat said work, and means for restoring said shifted elements to normal position on said movable member in advance of presentation thereof to said shifting means.

4. The combination with apparatus having relatively movable work supporting and treating members, of control mechanism comprising a member movable in fixed ratio to said relative movement of said supporting and treating members, a plurality of elements carried by said movable member and shiftable relative thereto, stationary means confronting and permanently spaced from said shiftable elements for selectively shifting said elements to record characteristics of work on said support, means actuated by said shifted elements for causing said treating member to treat said work, and means for locking said shifted elements in shifted position during actuation thereby of said actuating means.

5. The combination with apparatus having relatively movable work supporting and treating members, of control mechanism comprising a member movable in fixed ratio to said relative movement of said supporting and treating members, a plurality of elements carried by said movable member and shiftable relative thereto, a stationary member confronting said movable member, means fixed relative to said stationary member for selectively shifting said shiftable elements to record characteristics of work undergoing treatment, means positioned in the path of and actuated by said shifted elements for operating said treating member, and means on said stationary member for locking said shifted elements in shifted position during actuation thereby of said operating means and thereafter restoring said shifted elements to normal position in advance of presentation thereof to said shifting means.

6. The combination with treating apparatus having a movable work support and associated treating means, of control mechanism comprising a member movable at a given ratio to said support, a plurality of shiftable elements carried by said support, magnetic means responsive to travel of a work piece past a reference point for selectively shifting said shiftable elements to record characteristics of said work piece, a stationary positioning member spaced from said movable member, control means carried by and adjustably relative to said positioning member and actuated by engagement with said shifted elements for operating said treating means in direct relation to the travel of work therepast, a second stationary member spaced from said first stationary member and movable member, and means on said second stationary member for locking said shifted elements in shifted position during engagement thereof with said operating means and thereafter restoring said elements to normal position in advance of presentation thereof to said magnet.

7. The combination with apparatus having a movable work support and associated treating means, of control mechanism comprising a disk rotatable at a given ratio to said work support, a plurality of elements carried by said disk and shiftable axially thereof, an electromagnet fixed along the path of travel of said shiftable elements and energized on passage of work past a reference point for selectively shifting said elements to record characteristics of said work, a stationary positioning member, a plurality of control members carried by and adjustable peripherally of said positioning member, said control members being engageable with and actuated by said shifted elements for operating said treating means in correlation with travel of said work therepast, a stationary locking member confronting said rotatable disk, and means on said locking member for locking said shiftable elements in shifted position during actuation of said control members and thereafter restoring said shifted elements to normal position on said rotatable disk in advance of presentation thereof to said electro-magnet.

8. The combination with apparatus having a movable work support and associated treating means, of control mechanism comprising a member movable at a given ratio relative to said work support, a plurality of shiftable elements carried by said member, means for selectively shifting said elements to record characteristics of work on said support, control means actuated by said shifted elements for causing said treating means cyclically to treat said work, locking means associated with said movable member, and means on said elements and engageable on shifting thereof with said locking means for positively locking said shifted elements in shifted position during actuation thereby of said control means.

9. The combination with apparatus having a movable work support and associated treating means, of control mechanism comprising a member movable in coordination with said work support, a plurality of elements carried by and displaceable relative to said member, means actuated on travel of work on said support past a reference point for selectively shifting said elements to record characteristics of said work, control means disposed in the path of said elements and actuated thereby for cyclically controlling treatment of said work by said treating means, and locking means associated with said movable member and inter-locking with said shifted elements for positively locking said elements in shifted position during actuation of said control means.

10. The combination with apparatus having a movable work support and associated treating means, of control mechanism comprising a member movable in coordination with said work support, a plurality of elements carried by and displaceable relative to said member, means actuated on travel of work on said support past a reference point for selectively shifting said elements to record characteristics of said work, control means actuated by said shifted elements for cyclically controlling treatment of said work by said treating means in accordance with said characteristics of said work, and a stationary member associated with said movable member and having a channel for engaging and guiding said shifted elements in shifted position during actuation thereby of said control means.

11. The combination with apparatus having a movable work support and associated treating means, of control mechanism comprising a member movable in coordination with said support, a plurality of elements on and shiftable relative to said member, a stationary member disposed substantially normal to the direction of shifting of said shiftable elements and adapted to overlap confronting ends thereof, said stationary member having an opening for accommodating an end portion of each of said elements, means actuated by travel of said work on said support past a reference point for selectively shifting end portions of said elements through said opening, said stationary member beyond said opening engaging said end portions of said shifted elements and locking said elements in shifted position, control means actuated by said shifted elements for causing said treating means cyclically to treat said work in correspondence with said recorded characteristics, and means associated with said stationary member for restoring said shifted elements to normal position.

12. The combination with apparatus having a movable work support and associated treating means, of control mechanism comprising a member movable in coordination with said work support, a stationary member in substantial axial alignment with and included within marginal confines of said movable member, a plurality of shiftable elements carried by said movable member, said elements each having a portion clearing and another portion overlapping a marginal edge of said stationary member, an opening in said stationary member for receiving said overlapping portions of said elements, yieldable means normally projecting into said opening and engageable with said elements in advance of said member, said yieldable means being displaced axially of said stationary member for directing said overlapping portions of said shifted elements toward a side of said member, means adjacent said opening and actuated by travel of work on said support past a reference point for selectively shifting said overlapping portions of said shiftable elements into said opening, said stationary member beyond said opening engaging said overlapping portions of said shifted elements and locking said elements in shifted position, and means associated with said stationary member for restoring said shifted elements to normal position in advance of presentation thereof to said opening.

13. The combination with apparatus having a movable work support and associated treating means, of control mechanism comprising a member movable in coordination with said work support, a stationary member in substantial axial alignment with and included within marginal confines of said movable member, a plurality of shiftable elements carried by said movable member, said elements each having a portion clearing and another portion overlapping a marginal edge of said stationary member, an opening in said stationary member for receiving said overlapping portions of said elements, yieldable means normally projecting into said opening and engageable with said elements in advance of said member, said yieldable means being displaced axially of said stationary member toward a side thereof for directing said overlapping portions of said shifted elements to a side of said member, and said yieldable member on edge contact with said overlapping portions of said elements yielding to permit passage of said elements therebeyond, means adjacent said opening and actuated by travel of work on said support past a reference point for selectively shifting said overlapping portions of said shiftable elements into said opening, said stationary member beyond said opening engaging said overlapping portions of said shifted elements and locking said elements in shifted position, and cam means connected to said stationary member for restoring said shifted elements to normal position in advance of presentation thereof to said opening.

14. The combination with apparatus having a movable work support and associated treating means, of control mechanism comprising a member movable in coordination with said work support, a stationary member in substantial axial alignment with and included within marginal confines of said movable member, a plurality of shiftable elements carried by said movable member, said elements each having a portion clearing and another portion overlapping a marginal edge of said stationary member, an opening in said stationary member for receiving said overlapping portions of said elements, means adjacent said opening and actuated by travel of work on said support past a reference point for selectively shifting said overlapping portions of said shiftable elements into said opening, said stationary member beyond said opening engaging said overlapping portions of said shifted elements and locking said elements in shifted position, and cam means connected to said stationary member for restoring said shifted elements to normal position in advance of presentation thereof to said opening.

15. The combination with apparatus having a movable work support and associated treating means, of control mechanism comprising a rotary disk movable at a given ratio relative to said work support, a plurality of enlarged headed pins seated in said disk adjacent the periphery thereof and shiftable axially relative thereto, a stationary disk confronting and in substantially axial alignment with said rotary disk, said stationary disk having its periphery confined within portions and overlapping said enlarged heads of said pins, an annular channel in the periphery of said stationary disk, an opening in a wall of said stationary disk confronting said pins for passing said enlarged heads thereof into said channel, an electro-magnet substantially aligned with said opening and energized by travel of work on said support past a reference point for moving the heads of presented pins through said opening into said channel, said deflecting means being displaced axially toward a side of said stationary disk relative to said wall and engageable with said heads for deflecting said heads to a side of said wall, control switch means actuated by said heads of said shifted pins for cyclically controlling treatment of said work by said treating means in correlation accordance with said recorded limits of said work, and a cam interrupting said channel beyond said switch means for restoring said shifted pins to unshifted positions in advance of presentation thereof of said opening.

16. The combination with apparatus having a movable work support and associated treating means, of control mechanism comprising a rotary disk movable at a given ratio relative to said work support, a plurality of enlarged-headed pins seated in said disk adjacent the periphery thereof and shiftable axially relative thereto, a stationary disk confronting and in substantial alignment with said rotary disk, said stationary disk having its periphery confined within portions and overlapping said enlarged heads of said pins, an annular channel in the periphery of said stationary disk, an opening in a wall of said channel confronting said pins for passing said enlarged heads thereof into said channel, an electromagnet associated with said stationary disk beyond said opening and energized by travel of work on said support past a reference point for drawing the heads of presented pins through said openings into said channel to record limits of said work, deflecting means yieldably mounted on said stationary disk and normally projecting into said opening in advance of said wall of said channel, said deflecting means being displaced axially towards a side of said stationary disk relative to said wall and engageable with said heads for deflecting said heads to a side of said wall, control switch means actuated by said heads of said shifted pins for cyclically controlling treatment of said work by said treating means in correlation with said recorded limits of said work, and a cam interrupting said channel beyond said switch means for restoring said shifted pins to unshifted position in advance of presentation thereof to said opening.

17. The combination with apparatus having a movable work support and associated treating means, of control mechanism comprising a rotary disk movable at a given ratio relative to said work support, a plurality of enlarged-headed pins seated in said disk adjacent the periphery thereof and shiftable axially relative thereto, a stationary disk confronting and in substantial alignment with said rotary disk, said stationary disk having its periphery confined within portions and overlapping said enlarged heads of said pins, an annular channel in the periphery of said stationary disk, an opening in a wall of said channel confronting said pins for passing said enlarged heads thereof into said channel, an electro-magnet responsive to travel of work on said support past a reference point for moving the heads of presented pins through said opening into said channel, and a pair of control switches adjustably positionable about said stationary disk and actuated by said shifted pins for causing said treating means cyclically to treat said work over a portion thereof determined by said adjustment.

18. The combination with apparatus having a movable work support and associated treating means, of control mechanism comprising a member movable at a given ratio with said support, a plurality of elements carried by said member adjacent a marginal edge thereof and shiftable substantially axially of said member, a stationary guide member confronting said movable member, said guide member being disposed to stop enlarged end portions and pass adjoining restricted portions of said elements, an opening interrupting said guide member for individually passing said enlarged end portions of said elements therebeyond, means associated with said opening and actuated by travel of work on said support past a reference point for selectively shifting said end portions into said opening, cam means associated with said guide member for restoring said elements to normal position in advance of travel thereof past said opening and control switch means actuated by said shifted elements for cyclically controlling operation of said treating means.

19. The combination with apparatus having a movable work support and associated treating means, of control mechanism comprising a member movable at a given ratio with said support, a plurality of elements carried by said member adjacent a marginal edge thereof and shiftable substantially axially of said member, said elements each having an enlarged end portion and a restricted adjoining portion, a stationary guide member confronting said movable member, said guide member being disposed to stop enlarged end portions and pass adjoining restricted portions of said elements, an opening interrupting said guide member for individually passing said enlarged end portions of said elements beyond said member, means associated with said opening and actuated by travel of work on said support past a reference point for selectively shifting said end portions through said opening, control switch means actuated by said shifted elements for cyclically controlling operation of said treating means, and cam means associated with said guide member for restoring said elements to normal position in advance of travel thereof past said opening.

20. The combination with apparatus having a movable work support and associated treating means, of control mechanism comprising a member rotatable at a given ratio with movement of said support, a plurality of elements arranged about said rotatable member adjacent a periphery of and shiftable axially of said member, means responsive to movement of work on said support for selectively shifting said shiftable elements to record characteristics of said work, control means actuated by said shifted elements for cyclically controlling treatment of said work by treating means, and means associated with said rotatable member for positively locking said shifted elements in shifted position during actuation thereby of said control means and retaining said unshifted elements in unshifted position.

References Cited in the file of this patent

UNITED STATES PATENTS

| Number | Name | Date |
|---|---|---|
| 2,217,342 | Ladrach | Oct. 8, 1940 |
| 2,374,846 | Thresh | May 1, 1945 |